United States Patent [19]

Smith

[11] Patent Number: 4,620,078

[45] Date of Patent: Oct. 28, 1986

[54] POWER CONTROL CIRCUIT FOR MAGNETRON

[75] Inventor: Peter H. Smith, Anchorage, Ky.

[73] Assignee: General Electric Company, Louisville, Ky.

[21] Appl. No.: 664,321

[22] Filed: Oct. 24, 1984

[51] Int. Cl.⁴ .............................................. H05B 6/68
[52] U.S. Cl. .............................. 219/10.55 B; 219/492; 315/102; 315/106; 315/107; 331/87; 328/270
[58] Field of Search ................. 219/10.55 B, 10.55 E, 219/10.55 R, 492, 493; 315/102, 104, 105, 106, 107; 331/86, 87, 185, 186; 328/270, 258; 323/324; 363/28

[56] References Cited

U.S. PATENT DOCUMENTS

| | | | |
|---|---|---|---|
| 3,392,309 | 7/1968 | Hickman | 315/102 X |
| 3,752,948 | 8/1973 | Peterson | 219/10.55 B |
| 3,842,233 | 10/1974 | Lamb | 219/10.55 |
| 3,973,165 | 8/1976 | Hester | 331/87 X |
| 4,025,804 | 5/1977 | Rickard | 219/10.55 B X |
| 4,107,501 | 8/1978 | Ironfield | 219/10.55 B |
| 4,314,197 | 2/1982 | Sandler et al. | 323/324 |
| 4,318,165 | 3/1982 | Kornrumpf et al. | 328/270 X |
| 4,321,447 | 3/1982 | Lamb | 219/10.55 B |
| 4,375,587 | 3/1983 | Perl | 219/10.55 B |
| 4,383,156 | 5/1983 | Furusawa | 219/10.55 B |

Primary Examiner—Philip H. Leung
Attorney, Agent, or Firm—H. Neil Houser; Radford M. Reams

[57] ABSTRACT

A duty cycle power control circuit for a magnetron including a power transformer having a primary winding, a secondary anode winding for supplying anode voltage to the magnetron and a secondary filament winding for energizing the filament of the magnetron. In the illustrative embodiment the power transformer primary winding comprises a main winding and a serially connected standby winding. Duty cycle controlled switching devices are effective in a standby state to connect the main winding in series with the standby winding across an external power supply and are effective in the power on state to disconnect the standby winding and connect the main winding directly across the external power supply. The ratio of the standby winding turns to main winding turns is selected such that when the standby winding is serially connected to the main winding the anode voltage supplied at the secondary of the power transformer is below the minimum anode voltage level for microwave energy generation and when the standby winding is disconnected from the main winding the secondary anode voltage is greater than this minimum anode voltage level; in either instance the filament voltage is sufficient to maintain the filament temperature high enough to avoid moding in the magnetron.

7 Claims, 1 Drawing Figure

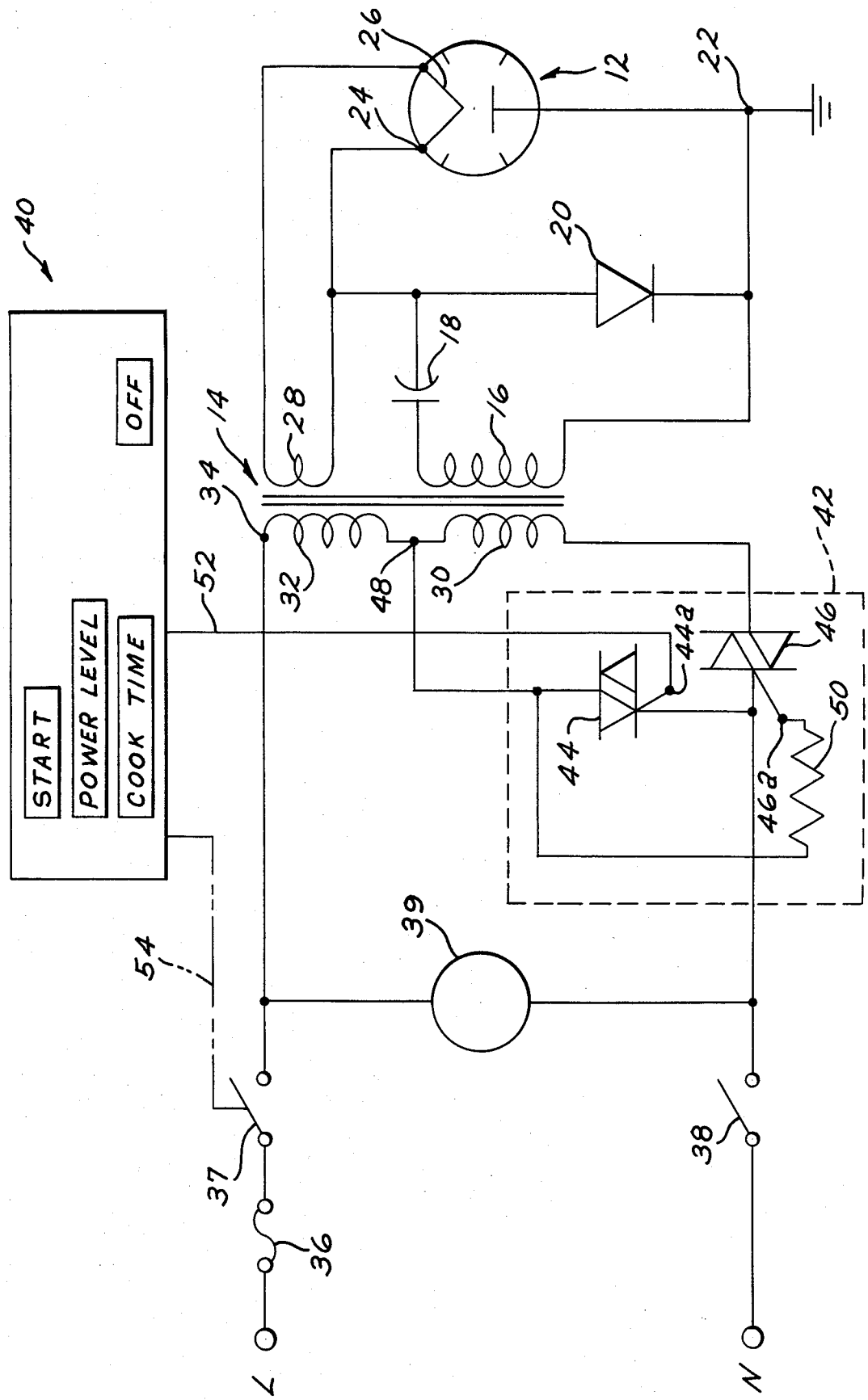

POWER CONTROL CIRCUIT FOR MAGNETRON

BACKGROUND OF THE INVENTION

The present invention relates generally to power control circuits for magnetrons and more particularly to duty cycle power control circuits for magnetrons incorporated in microwave ovens.

Microwave ovens conventionally employ a magnetron for producing microwave energy and a high voltage DC pulsed power supply for the magnetron. A well known high voltage DC power supply circuit is the combination of a high voltage ferro resonant voltage regulating power transformer and a half wave voltage doubler circuit coupling the secondary of the power transformer to the magnetron.

It is a desirable feature in a microwave oven to include means for varying the power level of the microwave energy produced by the magnetron. Conventionally this power level is varied by varying the duty cycle of the magnetron. In this approach full voltage is supplied to the magnetron on an intermittent basis. For example, for a 50% duty cycle voltage supplied to the magnetron and thus microwave power supplied to the food during any instant is either at a maximum or zero, but the average power over a period of time is approximately 50% of the full power. On and Off times ranging from 1 second up to 30 seconds have been employed with on/off times in the 15-30 second range being most common. Typically, an electronic switch such as a triac is employed in the transformer primary circuit to control the duty cycle. In some instances a separate filament transformer is used to energize the magnetron filament. A commonly used more cost effective approach is to provide a filament winding as a secondary on the power transformer.

While use of a filament winding in lieu of a separate filament transformer provides a significant cost advantage, a disadvantage of this approach is that the duty cycle control of the primary winding of the main transformer also duty cycles power to the magnetron filament causing it to undergo considerable variation in operating temperature. Since typically, for domestic microwave ovens duty cycles are on the order of 15 seconds or longer, the filament cools down during the off times and therefore starts from a cold condition which can result in severe moding in the magnetron. In order to reduce the moding associated with starting from a cold condition, the duty cycle may be set to allow for filament pre-heat. Typically, a pre-heat time of at least two seconds is required resulting in a two second loss in cooking time on each cycle.

U.S. Pat. No. 3,392,309 to Hickman addresses the problem of initially turning on an oven with a cold filament. Hickman makes advantageous use of the unique voltage/current characteristic of the magnetron. Specifically, a magnetron draws an insignificant amount of plate current below a threshold anode voltage level, which level is typically approximately 95% of its rated anode operating voltage. When the magnetron anode voltage is below this threshold level very little plate current will flow. Hickman connects a resistor in series with the primary winding. The value of this resistor is selected such that when connected in series with the primary, the anode voltage supplied at the secondary winding is limited to a value slightly less than the threshold level. At this level, however, the output voltage at the filament winding will be sufficient to heat the filament. A timing circuit automatically shunts this resistor after a predetermined warm-up time period has elapsed. Following the warm-up period the full rated anode and filament voltage are applied to the magnetron and the magnetron continues in normal operation.

Hickman is not directed to a duty cycle control arrangement for magnetron, hence there is no attempt to deal with the problem of the cooling of the filament during steady state operation under duty cycle control. In addition, the resistor in the Hickman circuit is an energy dissipating device which adversely affects the operating efficiency of the circuit.

Commonly assigned U.S. Pat. No. 4,318,165 to Kornrumpf et al provides continuous energization of the magnetron filament while duty cycle controlling the magnetron without resort to a separate filament transformer, in a power supply circuit of the high frequency resonant flyback circuit type. Means are provided for supplying filament power directly from the flyback circuit. This resonant flyback circuit is a radical departure in power supply design from the conventional 60 Hz power supply commonly used in domestic microwave ovens involving costly and complex circuitry.

A magnetron control circuit which continuously heats the cathode while duty cycle controlling the magnetron without resort to a separate transformer, without resort to costly energy dissipating circuit elements in the power circuit and which maintains the basic simplicity of the commonly used voltage regulating power transformer and half wave voltage doubler power supply circuit would be highly desirable.

It is therefore an object of this invention to provide an improved duty cycle power control circuit for a magnetron which uses the main power transformer to supply operating voltages to the magnetron filament and to the anode in conventional manner, modified to enable continuous energization of the filament.

It is a further object of this invention to provide a power control circuit of the aforementioned type which requires only a minor relatively inexpensive change to the conventional duty cycle power control circuit for magnetrons incorporated as the microwave energy source in microwave ovens.

SUMMARY OF THE INVENTION

These and other objects are accomplished by the present invention which comprises a duty cycle power control circuit for a microwave generating device of the type having an anode, and a filament characterized by a threshold anode voltage level above which anode current flows and below which anode current is substantially zero. The control circuit comprises a power transformer having a primary winding adapted for energization by an external power supply, a secondary anode winding for supplying anode voltage to the microwave generating device, and a secondary filament winding for supplying a filament voltage to the microwave generating device. Duty cycle control circuit means is provided operative to periodically switch the power transformer between a power on state and a standby state to implement the desired duty cycle for the microwave generating device. The power transformer windings are arranged such that in the standby state the anode voltage applied to the microwave generating device is less than the threshold level and in the power on state the anode voltage is greater than the threshold level and in both states the filament voltage is sufficient to maintain a filament temperature sufficiently high to avoid moding in the microwave generating device.

In a preferred form of the invention the power transformer primary winding comprises a main winding and a serially connected standby winding. The duty cycle controlled circuit means comprises a duty cycle controlled switching device effective in a standby state to connect the main winding in series with the standby winding across the external power supply and effective in the power on state to disconnect the standby winding and connect the main winding across the external power supply. The ratio of the standby winding turns to main winding turns is selected such that when the standby winding is serially connected to the main winding the anode voltage supplied at the secondary of the power transformer is below the anode threshold level but the filament voltage is sufficiently high to maintain an adequate temperature for the filament and when the standby winding is disconnected from the main winding the secondary anode voltage is greater than the anode threshold level causing the magnetron to conduct current and generate microwave energy. Satisfactory results have been obtained with this form of the invention with a ratio of standby winding turns to main winding turns in the range of 0.15 to 0.2.

In its preferred form the switching device comprises a pair of current controlling devices such as triacs, with the first device connected in series with the standby winding and the second device connected in parallel with the serially connected standby winding and first current controlling device. The first and second current controlling devices are arranged such that the first device is conductive and the second device is non-conductive in the standby state and the first device is non-conductive and the second device is conductive in the power on state.

Since the magnetron is non-conductive when the standby winding is connected in the primary circuit the standby winding may be formed of a smaller gage wire than the main winding.

BRIEF DESCRIPTION OF THE DRAWINGS

While the novel features of the invention are with particulariLy in the appended claims, the invention, both as to organization and content, will be better understood and appreciated along with other objects and features thereof from the following detailed description taken in conjunction with the FIGURE which shows a schematic diagram of a magnetron power control circuit embodying the present invention.

DETAILED DESCRIPTION OF THE INVENTION

Referring to the FIGURE the illustrated circuit is adapted to be connected between one power line L and the neutral conductor or power line N of a standard 220-240 volt, 60 Hz, single phase 3-wire supply network, the voltage between "L" and "N" being normally in the range of 110-120 volts.

The circuit includes a magnetron 12 which generates cooking microwaves when energized from a suitable high voltage DC source. Magnetron 12 in this illustrative embodiment is of the directly heated type readily commercially available from Toshiba identified by the model number 2M170. The magnetron power supply includes a power transformer 14 having a high voltage secondary winding 16 connected to energize the magnetron 12 through a half wave voltage doubler circuit comprising a series capacitor 18 and a rectifying diode 20 connected across the magnetron anode and filament terminals 22 and 24 respectively and oppositely poled with respect thereto. The filament 26 of magnetron 12 is connected to be energized by a low voltage secondary winding 28 of transformer 14. This secondary circuit arrangement is of conventional design.

Power transformer 14 is preferably of the high leakage reactance ferro resonant voltage regulating type conventionally employed in microwave oven power supplies in which the primary winding is modified in accordance with the present invention to include a standby winding 30 serially connected to an othewise conventional main winding 32. Power line L is coupled to terminal 34 of primary 32 through a fuse 36, and a main power relay switch 37. Though not shown, such circuits typically may also include a door interlock switch and a thermal protector inserted between the power line L and the primary terminal 34. Door interlock switch 38 connects the neutral line N to the power circuit. A blower motor 39 which is used to drive a fan for cooling the magnetron is also connected across the L and N power source terminals.

The main power relay switch 37 operates to arm the power circuit by turning on the oven in response to the manual actuation of a start button or switch on the oven input controls signaling completion of the entry of operating instructions into the oven control and disarming the power circuit at the completion of the preselected cooking operation. Switch 38 is under control of the electronic control system 40, the operation of which will be explained in somewhat greater detail hereinafter.

Duty cycle control of the primary of power transformer 14 is implemented via duty cycle controlled circuit means 42 comprising a pair of current control devices preferably in the form of triacs 44 and 46. A tap terminal 48 at the intersection of main winding 32 and one side of standby winding 30 is connected to supply line N via triac 44. The other side of standby winding 30 is connected to line N via current triac 46. Tap terminal 48 is also connected to the gate terminal 46a of triac 46 via current limiting resistor 50. Suitable switching circuitry (not shown) which is part of the electronic control package 40 is coupled to the gate terminal 44(a) of triac 44 to operate triac 44 in a duty cycle control mode. By this arrangement when one of triacs 44 and 46 is conductive, the other is not. More specifically when triac 44 is switched into conduction by an appropriate control signal from control 40 applied to its gate terminal 44a via line 52, current applied to gate 46a is insufficient to trigger triac 46 into conduction. However, when triac 44 is non-conductive, the voltage developed at terminal 48 of standby winding 30 is sufficient to trigger triac 46 into conduction.

The state of circuit 42 when triac 44 is conductive and triac 46 is non-conductive is defined as the power on state. Triac 46 conductive and triac 44 non-conductive defines the standby state for circuit 42. Circuit 42 is effective in its standby state to serially connect standby winding 30 with main winding 32 across lines L and N. In its power on state circuit 42 effectively switches standby winding 30 out of the circuit and connects main winding 32 across lines L and N.

As will be hereinafter discussed, magnetron 12 conducts during the power on state and is substantially non-conductive during the standby state. Hence, duty cycle control may be implemented by periodically switching circuit means 42 between its standby state and its power on state. While triacs are preferred switching devices for circuit 42 it will be appreciated, however, that other types of controlled switching elements may be employed, such as relay contacts or cam operated switches.

Electronic control 40 provides the necessary control signals for governing the cooking operation. Such controls are well known in the art and will be described hereafter only functionally as it relates to the operation of the circuit according to the invention. Control 40 in a known manner provides for an input panel shown functionally in the FIGURE having user operable means whereby an oven operator may enter the time for which food is to be cooked (COOK TIME), the power level at which the magnetron is to operate during this time (POWER LEVEL), a start button (START) to initiate the cooking operation, and an off button (OFF) to terminate or interrupt the cooking operation.

In response to these inputs from the user electronic control 40 provides a first signal on line 54 to close power relay contacts 37 in response to engagement of the start button by the user. Control 40 also periodically generates a trigger signal on line 52 for controlling triac 44 to implement the duty cycle associated with the selected power setting. For example, if the operator selects a 50% power setting a 50% duty cycle is implemented by triggering triac 44 alternately on and off for periods of approximately 7.5 seconds. The trigger signal on line 54 is periodically applied until the cook time selected has expired at which time it ceases and a stop cook signal is provided on line 54 to end the cooking operation by opening the power relay switch 37.

It will be recalled that an object of the present invention is to provide a means of continuously energizing the magnetron filament while duty cycle controlling the output power of the magnetron without resort to a separate filament transformer. To this end advantageous use is made of that well-known characteristic of magnetrons that for anode voltages less than a predetermined threshold voltage no significant anode current flows in the magnetron and no microwave energy is generated. For anode voltages above this level current flows to permit microwave energy generation. For most magnetrons the anode voltage cut-off level is approximately 95% of its rated anode operating voltage.

In accordance with a preferred form of the present invention a simple, efficient and relatively low cost means for reducing the anode voltage to a level less than the threshold level is to selectively increase the number of turns in the primary winding of the power transformer. In the illustrative embodiment the main winding 32 comprises the primary winding of a conventional power transformer normally employed in a microwave oven application. Power transformer primary 32 is modified to include additional serially connected standby winding 30. It has been empirically determined that satisfactory results may be achieved with conventional microwave oven power transformers modified to include the additional standby winding with a ratio of the number of turns of standby winding 30 to the main winding 32 in the 0.15 to 0.2 range. Using a ratio in this range, the secondary anode voltage may be maintained at a level sufficiently low to prevent magnetron flow while keeping the secondary filament winding voltage high enough to energize the filament sufficiently to maintain a filament temperature at a temperature which avoids moding of the magnetron.

In the illustrative embodiment main winding 32 comprises 112 turns and standby winding 30 has 18 turns. For this arrangement when the 120 volt AC is applied across the main winding only, the anode plate current is approximately 270 milliamps and the filament temperature is heated to about 3280° F. When the 120 volts is applied across the series combination of the main winding 32 and the standby winding 30 the plate current drops to a negligible level on the order of 20 milliamps but the filament temperature drops only to about 3000° F. For the magnetron of the illustrative embodiment this temperature is sufficiently high to avoid moding which typically occurs at filament temperatures of 2900° F. or less for the magnetron of the illustrative embodiment. For other magnetrons higher or lower filament temperatures may be preferable.

In operation, in response to user actuation of the start button control 40 generates a signal on line 54 effective to close power relay contacts 37 thereby placing the circuits in a standby mode. Circuit means 42 is in its standby state effectively connecting standby winding 30 in series with main winding 32 across power lines L and N. With the standby winding 30 in the circuit, the secondary anode voltage across winding 16 is less than the magnetron threshold level and magnetron 12 is non-conductive. However, the filament voltage across winding 28 is sufficient to heat filament 26 to approximately 3000° F. To implement the duty cycle control a trigger signal is periodically provided to gate terminal 44a of triac 44 in accordance with the selected duty cycle thereby periodically switching circuit 42 to its power on state. In the power on state standby winding 30 is effectively switched out of the circuit and the main winding 32 is applied across lines L1 and N via triac 44. Now the secondary voltage across secondary anode winding 16 is sufficiently above the magnetron threshold level to cause plate current to flow providing the desired microwave energy.

If desired, since in the standby mode the transformer draws only about 40 watts, the standby winding may be wound of a lower gage wire than the primary winding.

It will be apparent from the foregoing that the present invention provides a simple, effective and improved duty cycle control circuit for a magnetron which allows the continuous energization of the magnetron filament without requiring an additional separate filament transformer. A significant benefit of this approach is that it permits the efficient use of much shorter duty cycles for duty cycle control to enhance cooking performance. The implementation of circuit improvement requires merely the addition of slightly modified power transformer and an additional triac and current limiting resistor to the conventional power control circuit.

While specific embodiments of the invention have been illustrated and described herein it is realized that modifications and changes will occur to those skilled in the art. It is, therefore, to be understood that the appended claims are intended to cover all such modifications and changes as fall within the true spirit and scope of the invention.

What is claimed is:

1. A duty cycle power control circuit for a microwave generating device of the type having an anode, a cathode, and a filament for heating the cathode and characterized by a threshold anode voltage level above which sufficient anode current flows to generate microwave energy and below which anode current is substantially zero, said control circuit comprising:

a power transformer comprising a primary winding adapted for energization by an external power supply, a secondary anode winding for supplying an anode voltage to the microwave generating device and a secondary filament winding for supplying a filament-voltage to the microwave generating device, said primary winding comprising a main winding and a serially connected standby winding;

duty cycle controlled circuit means for periodically switching between a power on state and a standby state to implement the desired duty cycle for the microwave generating device, said duty cycle controlled circuit means being effective in its standby state to connect said main winding in series with said standby winding across an external power supply and effective in its power on state to disconnect said standby winding and connect said main winding across the external power supply;

said power transformer windings being arranged such that when said circuit means is in its standby state the anode voltage applied to the microwave generating device is less than the threshold level and when in its power on state the anode voltage is greater than the threshold level and in both states the filament voltage is sufficient to maintain a filament temperature above a predetermined minimum temperature set sufficiently high to avoid moding in the microwave generating device.

2. The power control circuit of claim 1 wherein said standby winding is formed of a smaller gage wire than said main winding.

3. The power control circuit of claim 1 wherein the ratio of standby winding turns to main winding turns is in the range of 0.15–0.20.

4. The power control circuit of claim 1 wherein said duty cycle controlled switching means comprises a first current controlling device connected in series with said standby winding and a second current controlling device connected in parallel with said standby winding and said first current controlling device; said first current controlling device being conductive and said second current controlling device being non-conductive in said standby state and said first current controlling device being non-conductive and said second current controlling device being conductive in said power on state.

5. In an improved duty cycle power control circuit for a microwave oven of the type employing a magnetron having an anode, a cathode and a filament for heating the cathode and characterized by a threshold anode voltage above which sufficient anode current flows to generate microwave energy and below which anode current is substantially zero and a filament threshold temperature above which magnetron moding is avoided, and incorporating a step-up power transformer comprising a main primary winding adapted for energization by an external power supply, a secondary filament winding for energizing the filament and a secondary anode winding for energizing the magnetron, the improvement comprising:

a standby winding connected in series with the main primary winding; and duty cycle controlled switch means operative to periodically disconnect said standby winding and couple the main primary winding across the power supply to implement the desired duty cycle;

the relative number of turns for the main primary winding and said standby winding being selected such that the anode voltage applied to the magnetron exceeds the threshold level when said standby winding is disconnected, and is less than the threshold level when said standbly winding is connected and the secondary filament voltage remains high enough to maintain filament temperature sufficient to avoid moding regardless of whether the standby winding is connected.

6. The power control circuit of claim 5 wherein said standby winding is formed of a smaller gage wire than said main winding.

7. The power control circuit of claim 5 wherein the ratio of standby winding turns to main primary winding turns is in the range of 0.15–0.20.

* * * * *